US009530197B2

(12) United States Patent
Cabrera-Cordon et al.

(10) Patent No.: US 9,530,197 B2
(45) Date of Patent: Dec. 27, 2016

(54) DIGITAL SIGNAGE FOR IMMERSIVE VIEWS

(71) Applicant: Microsoft Technology Licensing, LLC, Redmond, WA (US)

(72) Inventors: Luis Eduardo Cabrera-Cordon, Bothell, WA (US); Roberto Javier Bojorquez Alfaro, Bothell, WA (US); Hae-jin Lee, Seattle, WA (US); Jason Chen, Bellevue, WA (US); Doyop Kim, Fremont, CA (US)

( * ) Notice: Subject to any disclaimer, the term of this patent is extended or adjusted under 35 U.S.C. 154(b) by 0 days.

(21) Appl. No.: 14/701,489

(22) Filed: Apr. 30, 2015

(65) Prior Publication Data

US 2016/0321791 A1 Nov. 3, 2016

(51) Int. Cl.
*G06T 7/00* (2006.01)
*G06T 5/50* (2006.01)
*G06T 19/00* (2011.01)

(52) U.S. Cl.
CPC ............ *G06T 5/50* (2013.01); *G06T 19/003* (2013.01); *G06T 19/006* (2013.01)

(58) Field of Classification Search
None
See application file for complete search history.

(56) References Cited

U.S. PATENT DOCUMENTS

| 8,610,741 | B2 | 12/2013 | Szeliski et al. |
| 8,941,685 | B1 | 1/2015 | Chapin et al. |
| 8,942,921 | B1* | 1/2015 | Unnikrishnan ......... G06F 3/147 345/634 |
| 9,082,214 | B2* | 7/2015 | Smoot ................... G06T 19/006 |
| 2006/0238383 | A1 | 10/2006 | Kimchi et al. |
| 2007/0185681 | A1* | 8/2007 | McKitterick ........... G01C 7/06 702/159 |
| 2008/0180439 | A1 | 7/2008 | Adabala et al. |
| 2008/0183383 | A1 | 7/2008 | Asai et al. |
| 2009/0179895 | A1 | 7/2009 | Zhu et al. |

(Continued)

OTHER PUBLICATIONS

Sterling, et al., "Mapping the Indoor Marketing Opportunity", In Proceedings of Opus Research, Jan. 24, 2014, 26 pages.

(Continued)

*Primary Examiner* — Ashish K Thomas
(74) *Attorney, Agent, or Firm* — Sandip Minhas; Thomas Wong; Michael David Ream

(57) ABSTRACT

Techniques for generating and superimposing digital signage onto an immersive view. In an exemplary embodiment, certain entities are occluded or otherwise unviewable in an immersive view of an environment. For such entities, digital signage may be generated and superimposed in a suitable area of the immersive view, and further indicating, e.g., directions to such entities from a viewing location, as well as other metadata, such as business name, website, etc. To determine whether a nearby entity is displayed in the immersive view, a planar layout storing geometrical data associated with entities in the vicinity may be loaded and processed.

20 Claims, 12 Drawing Sheets

(56) References Cited

U.S. PATENT DOCUMENTS

| | | | | |
|---|---|---|---|---|
| 2009/0316951 | A1* | 12/2009 | Soderstrom | G06F 17/30241 382/103 |
| 2010/0004995 | A1 | 1/2010 | Hickman | |
| 2011/0164273 | A1* | 7/2011 | Masui | G03G 15/043 358/1.14 |
| 2012/0041722 | A1* | 2/2012 | Quan | G06T 7/0071 703/1 |
| 2012/0124461 | A1 | 5/2012 | Barnett et al. | |
| 2012/0150573 | A1* | 6/2012 | Soubra | G06Q 10/06 705/7.11 |
| 2012/0179518 | A1* | 7/2012 | Jaipaul | G08G 1/164 705/14.4 |
| 2012/0310717 | A1 | 12/2012 | Kankainen | |
| 2013/0275040 | A1* | 10/2013 | Dicke | G01C 21/30 701/454 |
| 2013/0321397 | A1* | 12/2013 | Chen | G06T 17/05 345/419 |
| 2013/0321461 | A1 | 12/2013 | Filip | |
| 2014/0002440 | A1 | 1/2014 | Lynch | |
| 2014/0278847 | A1 | 9/2014 | Gallo | |
| 2015/0130788 | A1* | 5/2015 | Bailiang | G06T 15/10 345/419 |

OTHER PUBLICATIONS

Simonite, Tom, "A Smoother Street View", Published on: Jul. 28, 2010 Available at: http://www.technologyreview.com/news/419994/a-smoother-street-view/.

Dodge, Don, "Why Indoor Location will be bigger than GPS or Maps, and how it works", Published on: Apr. 2, 2013 Available at: http://dondodge.typepad.com/the_next_big_thing/2013/04/why-indoor-location-will-be-bigger-than-gps-or-maps.html.

"A New Streetside View", Published on: May 31, 2011 Available at: http://blogs.bing.com/maps/2011/05/31/a-new-streetside-view/.

International Search Report and Written Opinion Issued in PCT Application No. PCT/US2016/029643, Mailed Date: Jun. 17, 2016, 12 Pages.

Maass, et al., "Use of Depth Cues for the Annotation of 3D Geo-Virtual Environments", In Proceedings of 23rd International Cartographic Conference, Aug. 4, 2007, 10 pages.

Vaaraniemi, et al., "Enhancing the Visibility of Labels in 3D Navigation Maps", In Book Progress and New Trends in 3D Geoinformation Sciences, Lecture Notes in Geo information and Cartography, May 16, 2012, pp. 23-40.

* cited by examiner

DIGITAL SIGNAGE FOR IMMERSIVE VIEWS

BACKGROUND

Systems generating immersive views of designated environments are seeing widespread adoption in state-of-the-art Internet and mobile applications. Such systems may generate images that effectively "immerse" the user in any number of environments, e.g., street-side scenery, indoor areas, manufacturing or medical scenarios, etc., from the vantage point of a viewing location as specified by the user. Current technologies may further superimpose limited data, e.g., business names, store hours, and other digital "signage," on objects visible in the immersive view. However, entities of interest not within the field of view may not be recognized or indicated.

For example, a user may type an address corresponding to a bank, and the image system may deliver an immersive view corresponding to a viewer standing in front of the bank. However, current systems may not support placing digital signage indicating out-of-view entities, e.g., another bank directly behind the viewer, or other locations of interest around the corner that are not directly within the line-of-sight.

Accordingly, it would be desirable to provide techniques for an image generation system to generate and place digital signage corresponding to out-of-view entities of interest in an immersive view.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, various aspects of the subject matter described herein are directed towards techniques for indicating entities of interest in an immersive view, and further providing information associated with such entities of interest. In certain aspects, the view of an entity of interest may be obstructed by one or more occlusions, and such out-of-view entities may be identified using geometrical, geographical, or other planar layout data associated with an environment of the viewer. Digital signage containing data corresponding to the entities of interest may then be generated and superimposed onto a suitable canvas area of the immersive view.

Other advantages may become apparent from the following detailed description and drawings.

DETAILED DESCRIPTION

Various aspects of the technology described herein are generally directed towards techniques for generating immersive view of a user-specified environment or locale. It will be appreciated that certain features of the techniques described below may be used for any systems for generating immersive views, e.g., street-side views, indoor views, etc., and may find application in any types of imaging systems, e.g., virtual or augmented reality, telepresence, digital map applications, electronic or video gaming applications, etc. Such alternative exemplary embodiments are contemplated to be within the scope of the present disclosure.

The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

Modern image generation systems have the capability to digitally generate an immersive view of an environment according to user-specified parameters. The immersive view provides a user with the experience of being "immersed" in the specified environment, from a user-defined vantage point. Such systems may further allow for user interaction within the immersive view, e.g., to change the angle at which scenery is perceived by panning or tilting the viewing vantage point, and/or advancing the scenery along predetermined directions, etc.

Figure 1:
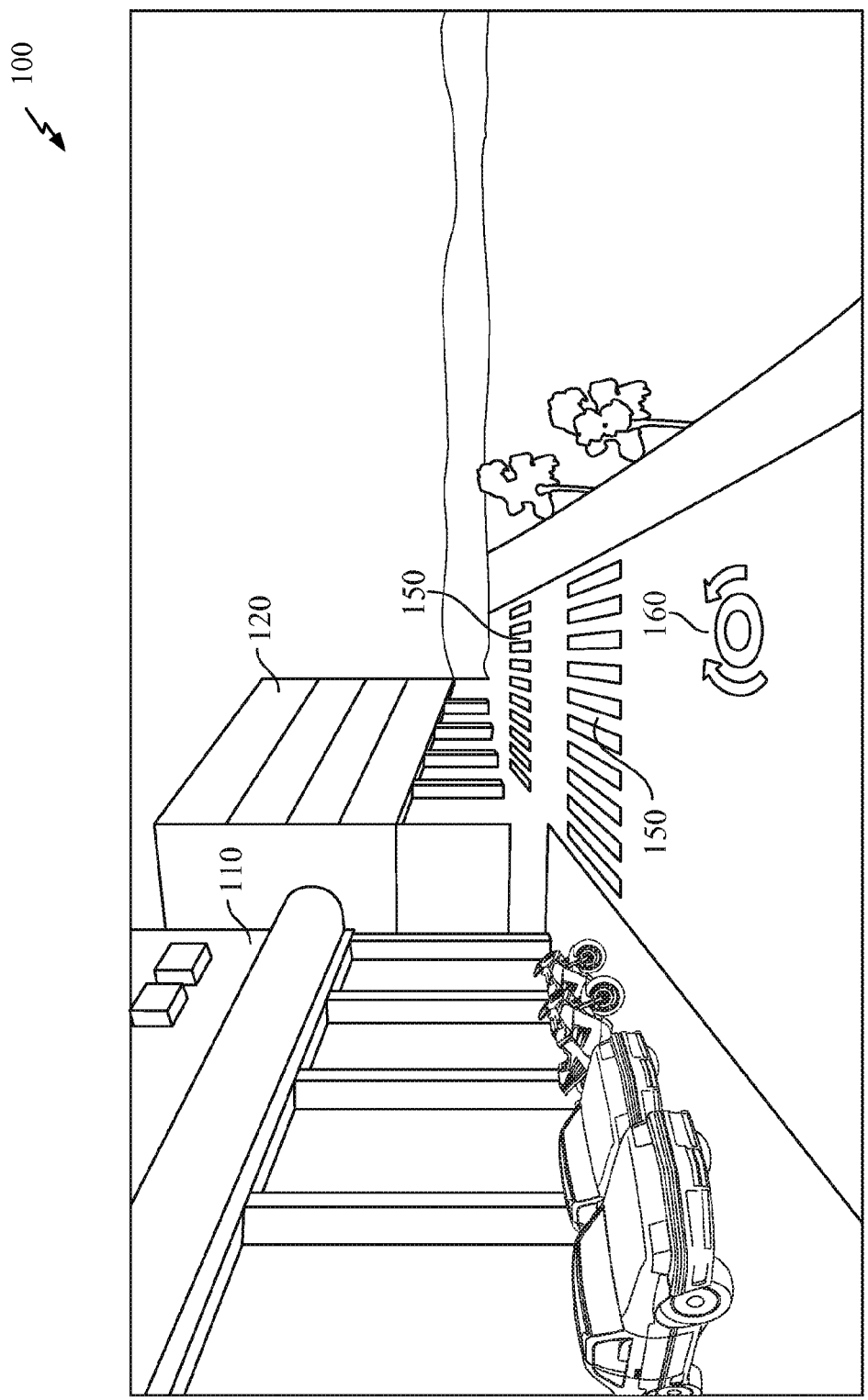
FIGS. 1-2 illustrate instances of an immersive view of certain street-side scenery, e.g., corresponding to a user-input street address, and a standard planar map corresponding to the environment shown in the immersive view.
Figure 2:
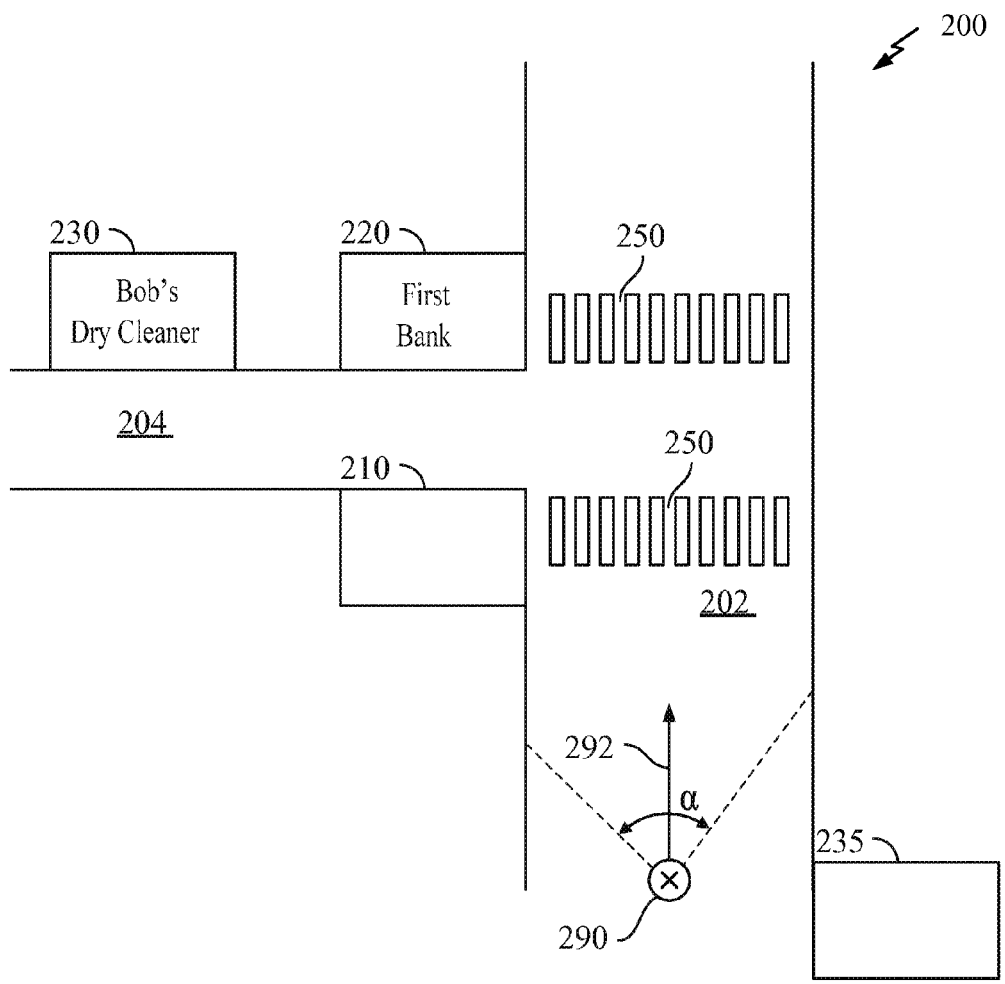

FIG. 1 illustrates an immersive view 100 of certain street-side scenery, corresponding to, e.g., a user-input street address. FIG. 2 illustrates a standard planar map 200 corresponding to the environment shown in immersive view 100. It will be understood that FIGS. 1-2 are shown for illustrative purposes only, and are not meant to limit the scope of the present disclosure to any particular types of views or scenery that can be processed using the technologies disclosed herein. Aspects of the present disclosure may accommodate, e.g., immersive views of street-side scenery, indoor areas, manufacturing or medical environments, telepresence applications, etc.

In FIG. 1, immersive view 100 shows various geographical items of note, such as buildings 110, 120, crosswalk 150, etc., from a designated viewing vantage point. Map 200 in FIG. 2 shows the same objects marked on a standard planar map as elements 210, 220, 250, respectively. Navigation icon 160 in FIG. 1 shows user-interactive controls superimposed onto immersive view 100 to allow the user to, e.g., change the viewing location, or angle from which immersive view 100 is generated. For example, by dragging the curved arrow in icon 160 in a given direction, the angle at which immersive view 100 is generated may be panned up and down, sideways, etc.

It will be appreciated that the correspondence between immersive view 100 and planar map 200 is generally determined by certain parameters, also denoted herein as "viewing parameters," associated with a viewing vantage point 290, illustratively marked with an "X" on map 200 in FIG. 2. In particular, viewing parameters may include, e.g., geographical coordinates (such as latitude/longitude, GPS coordinates, etc.), viewing orientation (illustratively indicated by vector 292), viewing elevation, one or more angles of view (illustratively denoted in FIG. 2 as "α"), etc. Thus immersive view 100 may correspond to the view of an environment that would be perceived by a human observer from the designated viewing vantage point 290, and further with the other viewing parameters as specified with vantage point 290.

In some implementations, the parameters of viewing vantage point 290 may be directly specified by a user of the system. For example, the user may type an address, latitude/longitude, or any other coordinates identifying the location of a specific vantage point, or "viewing location." Alternatively, certain of the viewing parameters may be inferred by the image generation system, e.g., based on sub-modules coupled to the image generation capable of detecting viewing orientation, current user location (e.g., in an application wherein a "user" of the image generation system is also identified with the "viewer" of an immersive view) using GPS, etc.

To generate an immersive view, an image generation system may access a stored digital database of real-life imagery, e.g., as obtained from digital photographs of a plurality of pre-specified environments, and/or post-processed versions of such photographs. Furthermore, an image generation system may display additional information associated with any objects identifiable by the system in a particular immersive view. For example, metadata relating to identified objects in view 100 may be digitally superimposed onto view 100, e.g., with metadata being placed adjacent to corresponding objects. Metadata may include, e.g., the names of businesses resident at a building, store hours, associated websites, paid-for advertising, etc.

Figure 3:
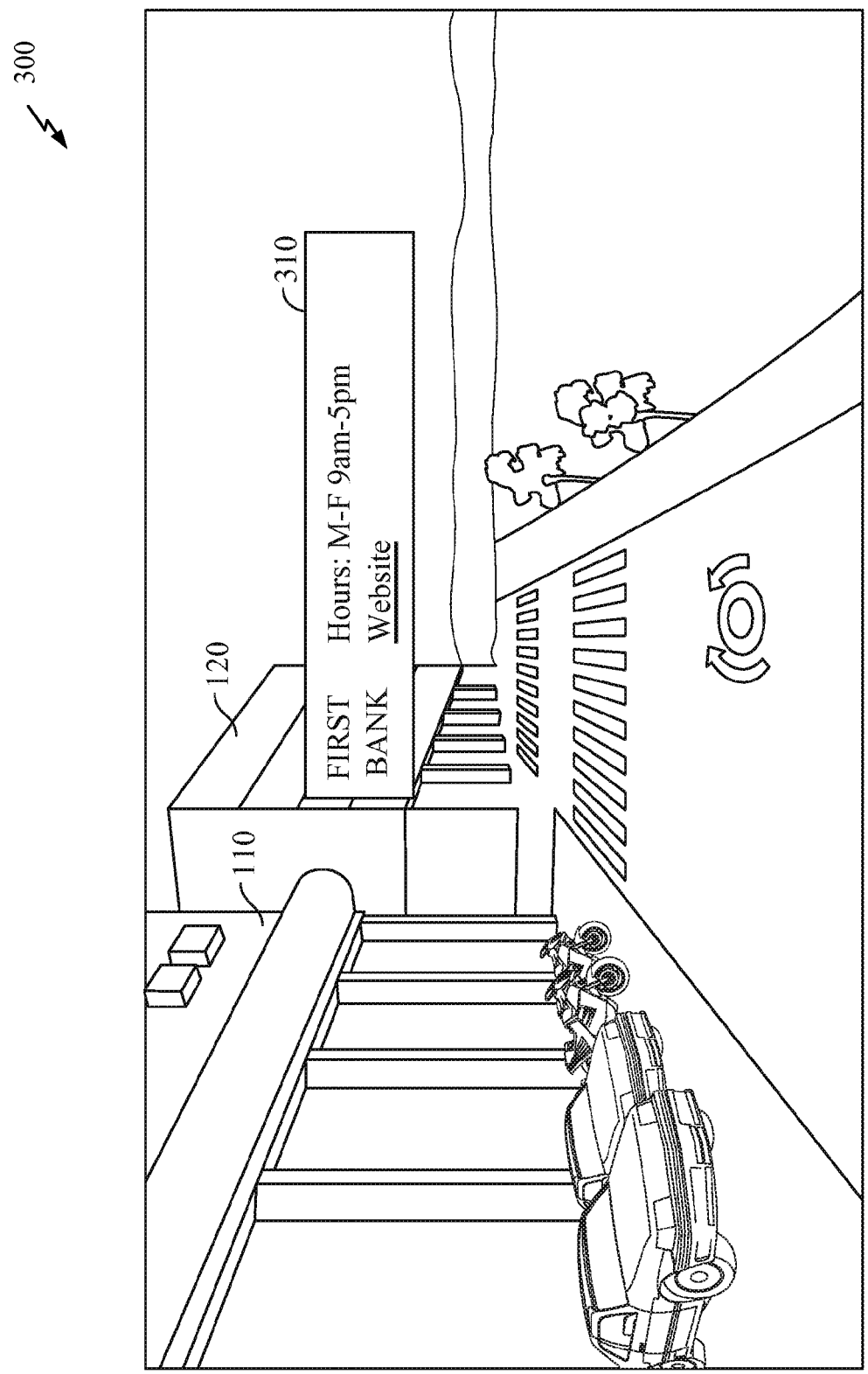
FIG. 3 illustrates digital signage superimposed on an immersive view, positioned adjacent to a building.

For example, FIG. 3 illustrates digital signage 310 superimposed on immersive view 300, positioned adjacent to building 120. Digital signage 310 shows, e.g., the name ("First Bank," as also illustratively indicated in FIG. 2 at element 220) of a business resident in building 120, along with information on business hours and associated website.

While digital signage 310 may readily be provided adjacent to building 120, which is located within a direct line of sight (LOS) of the viewing vantage point, it is more challenging to identify and place digital signage corresponding to entities not within the field of view. For example, note building 230 in FIG. 2 (illustratively labeled "Bob's Dry Cleaner") is not displayed in immersive view 100 in FIG. 1, because its view is blocked by building 110. In this case, the view of building 230 is designated as being "occluded" by building 110. Accordingly, the presence of building 110 as a (static) occlusion in the direct line of sight between viewing vantage point 290 and building 230 prevents digital signage for "Bob's Dry Cleaner" from being readily placed adjacent to building 230 in immersive view 100.

Alternatively, a building such as building 235 may also not be displayed in immersive view 100, as such a building lies outside the angle of view a defined by the viewing parameters. In both cases (i.e., when the view of an entity is occluded, or when an entity lies outside an angle of view defined by the viewing parameters), an entity is not displayed in immersive view 100, even though such entity may lie in the vicinity of the viewer.

Accordingly, it would be desirable to provide techniques for identifying entities of interest that are not displayed in an immersive view, and to generate and display digital signage for such entities in the immersive view.

Figure 4:
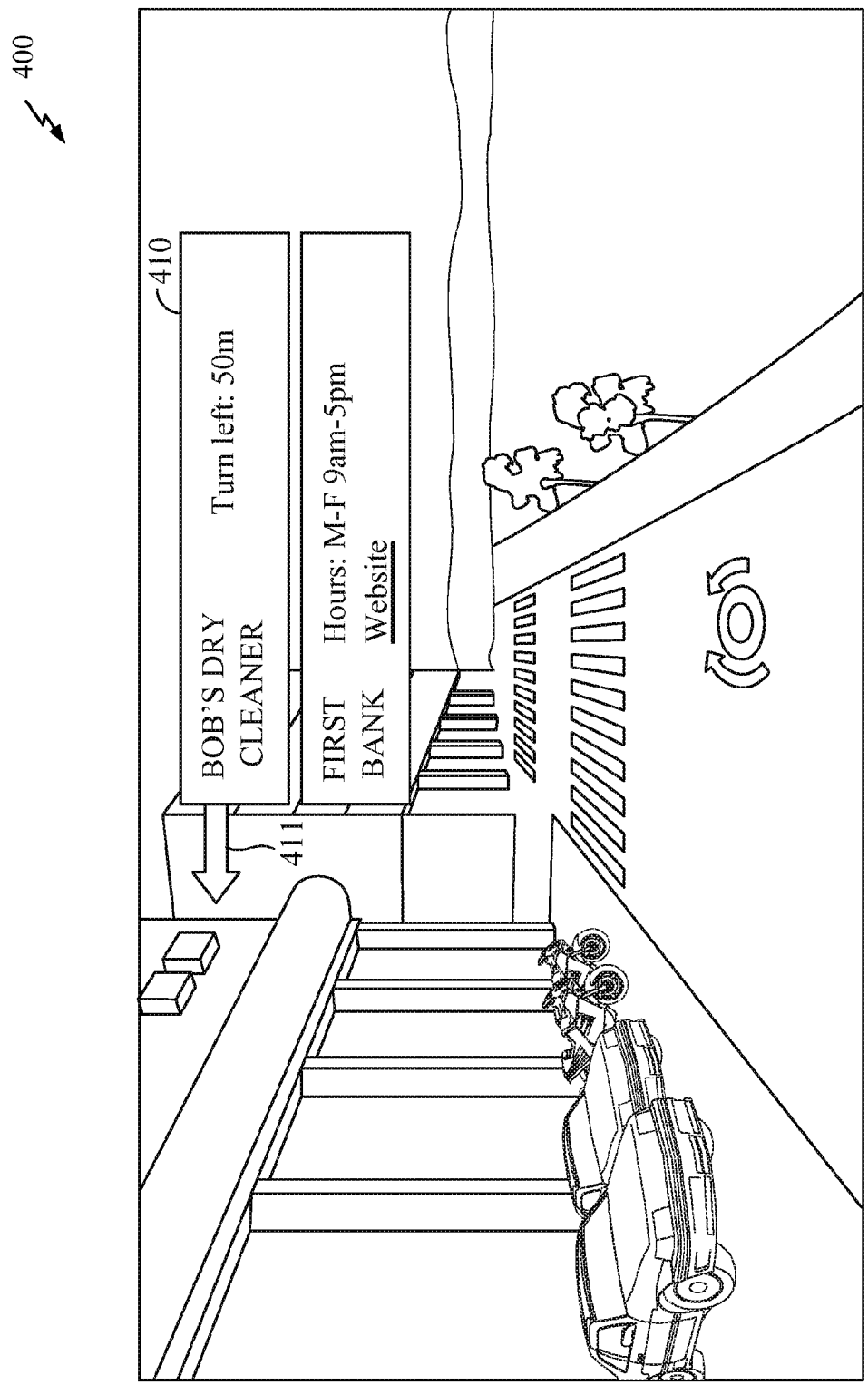
FIG. 4 shows an example of an immersive view generated according to techniques of the present disclosure.

FIG. 4 shows an illustrative immersive view 400 generated according to techniques of the present disclosure. In FIG. 4, digital signage 410 includes information for building 230 (e.g., "Bob's Dry Cleaner"), which was not originally within the viewer line of sight in immersive view 100. In the exemplary embodiment shown, digital signage 410 further illustratively includes directions to building 230. In an exemplary embodiment, the directions provided in digital signage 410 can be referenced from a location corresponding to signage 410 in immersive view 400 (e.g., "walk 50 meters due left"). In an alternative exemplary embodiment, directions can alternatively be referenced from the viewing vantage point, e.g., vantage point 290 as labeled in FIG. 2 (e.g., "walk 10 meters straight ahead, then turn left and walk 50 meters"). In an exemplary embodiment, digital signage 410 may include an arrow 411 pointing in the direction of the out-of-view entity.

By identifying and displaying digital signage for entities not displayed in an immersive view, the techniques of the present disclosure advantageously enhance the range of offerings and/or other objects of interest (also denoted herein as "preferred entities") that may be indicated to a viewer in the vicinity of the viewing location. Further note in alternative exemplary embodiments, out-of-view digital signage may also be superimposed for preferred entities not located in the immediate vicinity of the viewing location. For example, if a user inputs to the image generation system the name of a specific service provider (e.g., a bookstore), then the system may display digital signage corresponding to preferred entities offering similar types of services that need not reside within the immediate vicinity of the viewer (e.g., the web address of an online bookstore). Such alternative exemplary embodiments are contemplated to be within the scope of the present disclosure.

Figure 5:
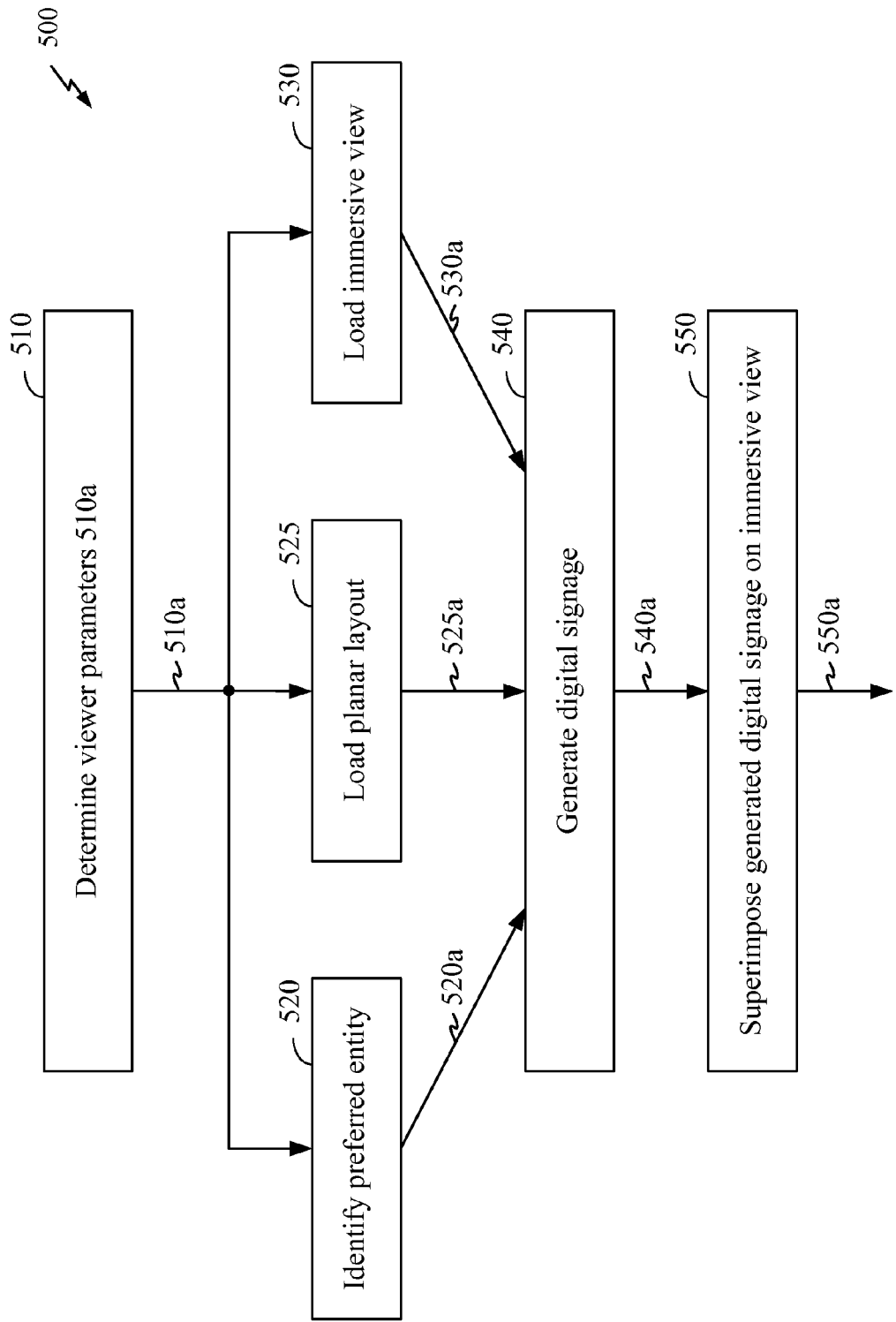
FIG. 5 shows an exemplary embodiment of an image generation system according to the present disclosure.

FIG. 5 shows an exemplary embodiment 500 of an image generation system according to the present disclosure. Note FIG. 5 is shown for illustrative purposes only, and is not meant to limit the scope of the present disclosure to any particular implementations or combinations of features described herein for generating an immersive view. For example, in alternative exemplary embodiments, a system may include only a subset of the functional blocks shown in FIG. 5.

Furthermore, FIG. 5 is not meant to suggest that the digital signage for out-of-view entities such as shown in FIG. 4 is necessarily automatically generated by a computing system according to techniques of the present disclosure. In alternative exemplary embodiments, digital signage such as 410 in FIG. 4 may be manually created and entered into a database, e.g., by a sponsor of a preferred entity, and further manually placed in certain immersive views prior to the time of user interaction with the image generation system. A computer implementing the image generation system may then digitally superimpose the manually positioned digital signage onto digital immersive views at the same time as or prior to when a user requests the generation of an immersive view. Such alternative exemplary embodiments are contemplated to be within the scope of the present disclosure.

In FIG. 5, at block 510, viewing parameters 510a of a viewer perspective are determined. In an exemplary embodiment, viewing parameters 510a are sufficient to specify a unique immersive view, e.g., immersive view 100, of an environment for display. Viewing parameters 510a may identify the viewing location within a geographical or topological frame of reference, and may include, e.g., geographical coordinates of user location such as latitude and longitude, GPS coordinates, street address, name or identifier of a business having a unique geographical location, etc. Viewing parameters 510a may further include an orientation in which the viewer's gaze is directed, viewing angle, altitude angle, etc. Viewing parameters 510a may also include a vertical elevation of the viewer, e.g., viewing elevation, if a viewer is standing at a raised or lowered elevation relative to surrounding landscape, etc.

In an exemplary embodiment, parameters 510a may be partially input to the system by the user, e.g., by typing in an address in a search bar, etc. In an alternative exemplary embodiment, the system may automatically derive at least some of viewing parameters 510a from, e.g., a GPS subsystem of the hardware on which the system is running, cellular base stations, etc. In an exemplary embodiment wherein the present techniques are incorporated in, e.g., a mobile device, a gyroscope or other directional determining subsystem on the mobile device may be utilized to provide information on viewing parameters, e.g., viewing orientation. Such alternative exemplary embodiments are contemplated to be within the scope of the present disclosure.

At block 520, one or more preferred entities 520a may be identified based on viewing parameters 510a. In particular, viewing parameters 510a may specify a viewing location, and the one or more preferred entities 520a may correspond to an entity in the vicinity of the viewing location. Alternatively, the one or more preferred entities 520a may correspond to an entity not necessarily in the vicinity of the viewing location, but related to some functional attribute with an entity specified in viewing parameters 510a, e.g., being a restaurant offering a similar type of food to a restaurant specified in viewing parameters 510a, etc.

In an exemplary embodiment, a preferred entity may correspond to any entity for which it is desired to place corresponding digital signage in immersive view 530a, e.g., containing information relevant to such preferred entity. In an exemplary embodiment, the identity of such a preferred entity may be, e.g., designated by the user, assigned by the system, or derived from both user input and system processing.

For example, in an illustrative scenario wherein the preferred entity is designated by the user, the user could input the address for a desired location, e.g., a business, a residence, park, landmarks, etc., and such desired location may correspond to a preferred entity. Alternatively, the image generation system may store predetermined locations that lie within a general vicinity of a viewing location, e.g., as determined at block 510, that could be relevant to the user. For example, system-assigned preferred entities may include landmarks of interest such as banks, parks, entertainment venues, and stores. Such entities may be based on user-specified preferences configured, e.g., at system initialization. In an exemplary embodiment, the system identifies businesses within the viewing vicinity that are similar or otherwise relate to a business originally designated by the user.

System-assigned preferred entities may further include preferred local or other businesses that may be relevant to the user at the specified viewing location. In an exemplary embodiment, the assignment of a business as a preferred entity may be driven by an advertising model, e.g., businesses may pay advertising fees to be identified as a preferred entity to certain users (e.g., users having specified matching preferences, or within a geographical vicinity of some area, etc.) or all users of the system. Such alternative exemplary embodiments are contemplated to be within the scope of the present disclosure.

Further based on the parameters 510a of viewer perspective as determined at block 510, at block 525, a planar layout 525a associated with the vicinity of the viewing location is loaded, e.g., into memory for processing. Planar layout 525a may correspond to, e.g., horizontal and/or vertical layout, location, and/or other geometrical data associated with the geographical environs of the viewing location. Planar layout 525a will generally specify corresponding height information for the entities present in the layout, and may thus be utilized to determine the presence of static occlusions in the line sight of a viewer to a chosen entity. Planar layout 525a may further specify identifying metadata associated with entities present in the layout, e.g., business names, business types, street addresses, etc.

Note planar layout 525a may generally encompass any type of environment, e.g., indoors or outdoors, urban or suburban or rural, single-level (e.g., a room in a house) or multi-level (e.g., one floor of a multi-floor indoor or outdoor shopping mall, subterranean), etc. Such alternative exemplary embodiments are contemplated to be within the scope of the present disclosure.

Figure 8:
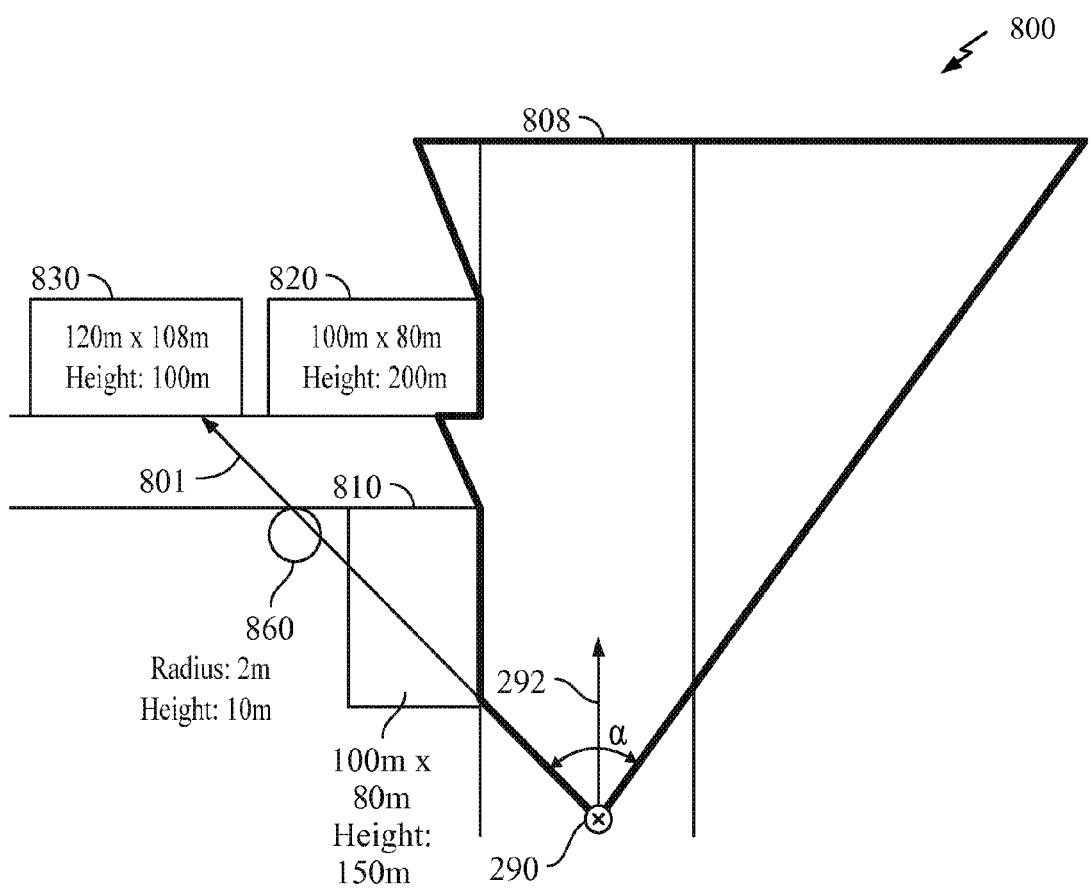
FIG. 8 illustrates an example of a planar layout corresponding to the illustrative immersive view described hereinabove with reference to FIGS. 1 and 2.

FIG. 8 illustrates an example 800 of a planar layout corresponding to the illustrative immersive view described hereinabove with reference to FIGS. 1 and 2. Note FIG. 8 is shown for illustrative purposes only, and is not meant to limit the scope of the present disclosure to any particular types of scenery or environments that can be accommodated. For illustrative purposes, entities labeled "8xx" in FIG. 8 may correspond to objects labeled "1xx" in FIG. 1, unless otherwise noted.

In FIG. 8, layout 800 includes multiple entities 810, 820, 830, 860. Each entity may correspond to, e.g., a static object of interest in layout 800, and each object may or may not occupy some planar space and/or vertical height. Examples of entities may include, e.g., local businesses, parks, roads, user-designated locations of interest, fixed objects such as trees, etc. Each entity may further be associated with geometrical data that specifies the physical dimensions of that entity, e.g., height, width, perimeter, radius, etc. Note in alternative exemplary embodiments (not shown), some entities need not occupy any vertical height, e.g., an entity may be separately associated with crosswalk 250 in FIG. 2. Furthermore, entities may also include information associated with objects not occupying any space, e.g., a designation of a point in planar layout 800 as corresponding to "The City of San Francisco" for reference purposes.

For example, in FIG. 8, entity 810, corresponding to building 110 in FIG. 1, is indicated as having associated surface area of 100 m×80 m, and a vertical height of 150 m. Similarly, entities 820 and 830 may have associated geometrical dimensions as indicated in FIG. 8. Note the surface area of entity 860 is expressed as having a radius of 2 m, and a vertical height of 10 m. Entity 860 may correspond to, e.g., a tree that is present in layout 800, and the presence of such entities in general may be noted in the layout 800 to aid in determination of the presence of static occlusions, as further described hereinbelow with reference to FIGS. 6 and 7.

Note the specification formats of geometrical data in FIG. 8 are shown for illustrative purposes only, and is not meant to limit the scope of the present disclosure. For example, in alternative exemplary embodiments, a planar layout may adopt alternative ways to specify the geometrical dimensions of an entity such as tree 860 or building 810, e.g., with alternative dimensional specifications (e.g., round versus straight lines), alternative constituent shapes, finer or coarser spatial granularity, and/or alternative numerical representations than are shown in FIG. 8. Such alternative exemplary embodiments are contemplated to be within the scope of the present disclosure.

Note entity 810 may correspond to building 110 in FIG. 1. It will be appreciated, however, that entity 810 need not correspond to all of building 110, and may merely correspond to e.g., a sub-section or some floors thereof. Other entities (not shown) may also be mapped to the spatial area occupied by building 110, e.g., other floors having other occupants, etc. To distinguish among multiple entities in a multi-story building, geometrical data may generally specify both horizontal and vertical (e.g., vertical elevation) location and spatial extent (e.g., the floor-to-ceiling height of an office) information associated with each entity.

Figure 9:
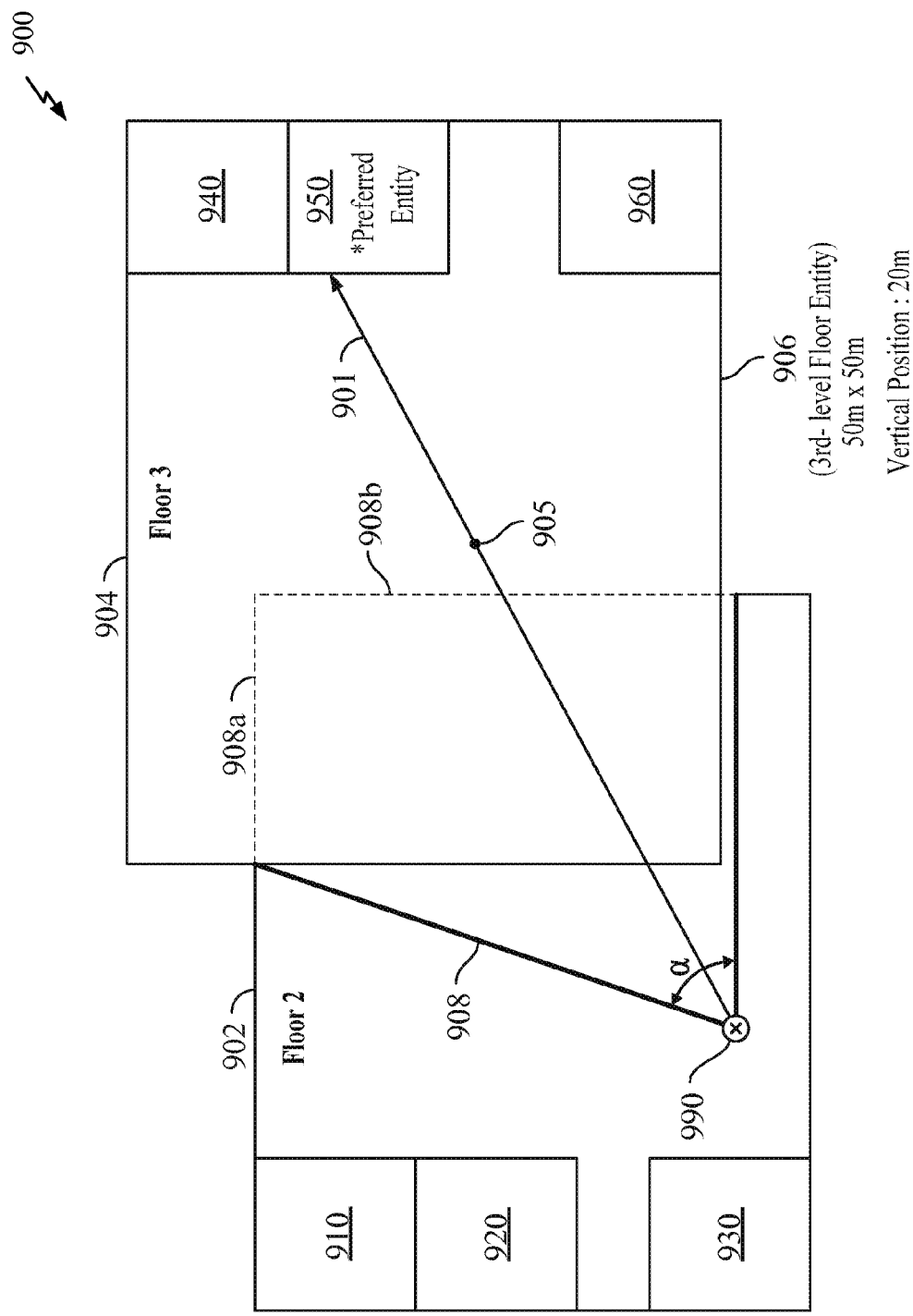
FIG. 9 illustrates an alternative example of a multi-level planar layout, corresponding to an environment inside a multi-level building, such as a multi-level shopping mall.

FIG. 9 illustrates an alternative example of a multi-level planar layout 900, corresponding to an environment inside a multi-level building, such as a multi-level shopping mall. In FIG. 9, the viewing location is illustratively on the 2nd floor of the building, as marked by location marker 990 in 2nd floor planar layout 902. Planar layout 900 further includes the planar layout 904 for a 3rd floor. Entities 910-960 are shown, each corresponding to, e.g., a stall or shop space, etc., in planar layouts 902, 904. Each of entities 910-960 may have associated geometrical data (not shown in FIG. 9), as similarly described with reference to entities 810-830 in FIG. 8.

In an exemplary embodiment, planar layouts 902, 904 may further contain associated information (not shown in FIG. 9) that represents the relative vertical separation and horizontal alignment between entities on the $2^{nd}$ and $3^{rd}$ floors. It will be appreciated that planar layouts encapsulating all such single- and multi-level floor and/or street and/or other environments are contemplated to be within the scope of the present disclosure.

Referring back to FIG. 5, at block 530, a digital image 530a for an immersive view corresponding to viewing parameters 510a is loaded into memory. Digital image 530a may also be denoted herein as an "unannotated immersive view," as distinguished from, e.g., (annotated) immersive view 550a generated by block 550, as further described hereinbelow.

In an exemplary embodiment, digital image 530a may correspond to, e.g., one of multiple images stored or generated for each of a plurality of reference points and/or viewing angles (not shown) on planar layout 525a. In an exemplary embodiment, such multiple images corresponding to a reference point may collectively constitute a 360-degree panoramic view of scenery as viewed from the perspective of that reference point. Such multiple images may be accessed from a pre-configured database, either online or offline. Based on, e.g., viewing parameters 510 specifying viewing location and viewing orientation as determined, the correct image 530a from the multiple stored images may be retrieved.

Referring back to FIG. 5, block 540 generates digital signage 540a to be superimposed onto unannotated immersive view 530a. In an exemplary embodiment, the positions in planar layout 525a corresponding to viewing location (e.g., as specified in parameters 510a) and preferred entity 520a are individually determined. Furthermore, the field of view covered by immersive view 530a in planar layout 525a may be determined.

For example, referring to FIGS. 1 and 8, illustrative immersive view 100 may be determined at block 540 to correspond to a field of view 808 (e.g., the area within the dark bold line) of planar layout 800 in FIG. 8.

At block 550, based on the information in 520a, 525a, 530a, digital signage 540a is generated. In an exemplary embodiment, digital signage 540a may incorporate and/or display, e.g., data and/or metadata corresponding to preferred entity 520a. Digital signage 540a may further include data or information specific to the location of preferred entity 520a with reference to immersive view 530a. For example, digital signage 540a may indicate the directions a viewer would follow to go from the current viewing location to arrive at preferred entity 520a.

Note such directions may be generated, e.g., using knowledge of planar layout 525a, as further described hereinbelow with reference to FIGS. 6 and 7. Alternatively, directions or other information to be included in digital signage 540a may be generated using other techniques, e.g., derived from manual commenting and annotation of specific immersive views 530a. In an exemplary embodiment, the generated directions may account for cases in which preferred entity 520a is occluded in immersive view 530a. Such directions may specify, e.g., that one would have to go around or otherwise bypass one or more occlusions to reach the preferred entity 520a. Techniques for determining directions from a viewing location to an occluded entity are further described hereinbelow with reference to FIGS. 6 and 7. Note, however, that such techniques are described for illustrative purposes only, and are not meant to limit the scope of the present disclosure to exemplary embodiments necessarily employing such techniques.

At block 550, digital signage 540a is superimposed on immersive view 530a to generate annotated immersive view 550a. In an exemplary embodiment, to generate immersive view 550a, block 550 may determine an optimal area of digital image 530a in which to place the generated digital signage 540a. For example, in cases wherein preferred entity 520a is within line of sight, then corresponding digital signage 540a may be placed directly adjacent to the image of preferred entity 520a in immersive view 550a. Alternatively, in cases wherein preferred entity 520a is occluded, or otherwise outside the field of view, then corresponding digital signage 540a may be placed in an area of immersive view 550a that is indicative of a direction to take to reach preferred entity 520a from the viewing location.

Figure 10:
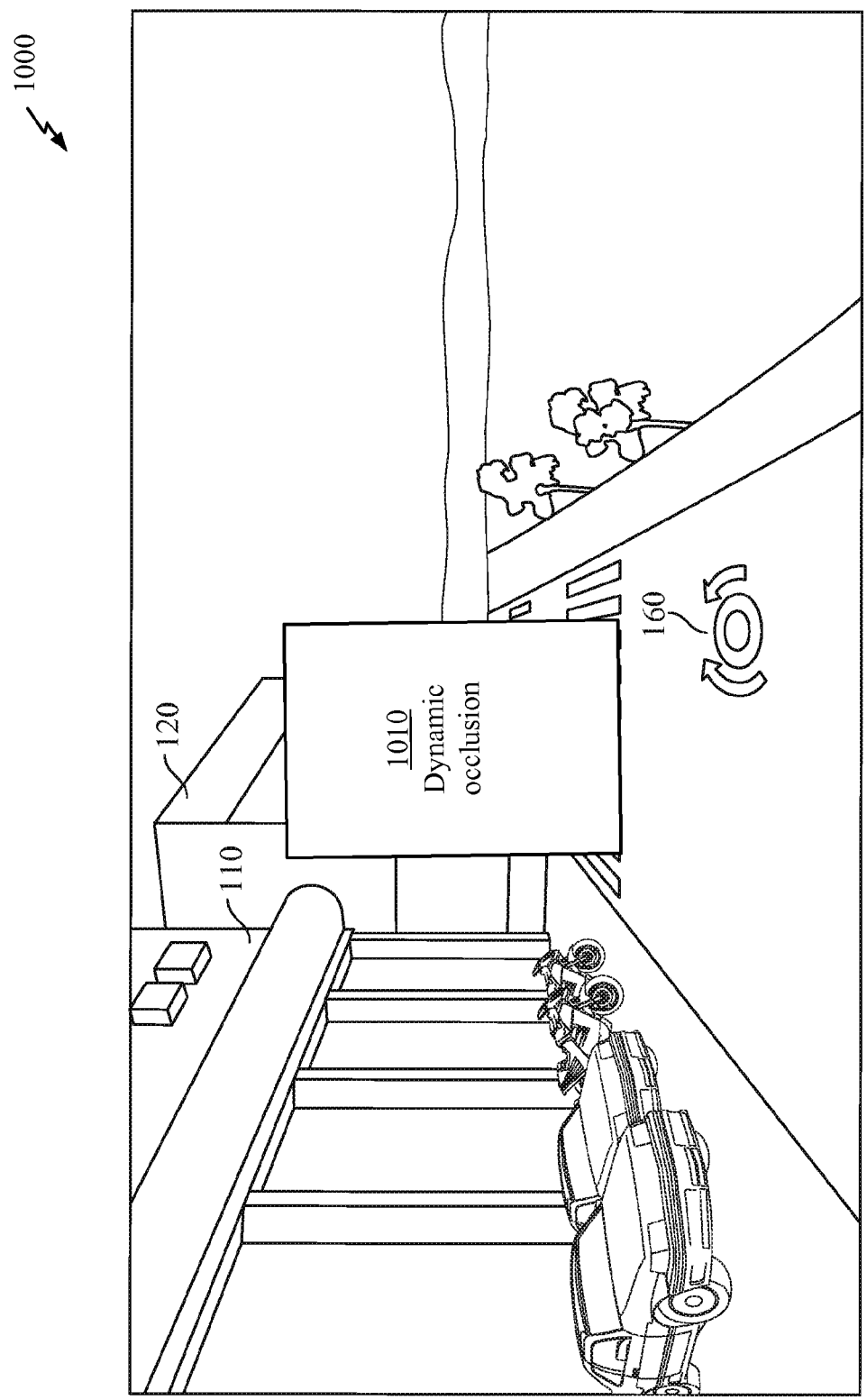
FIG. 10 illustrates an example of a dynamic occlusion.

Further considerations for placement of digital signage 540a may include the availability of suitably sized "blank" or "non-critical" space in immersive view 550a, e.g., corresponding to open sky, a wall of a building, an empty billboard, a billboard on the side of a truck for truckside advertising, etc. Such space may be automatically determined, e.g., using image recognition and pattern matching techniques applied to immersive views 530a, and/or utilizing object dimensional information as further described hereinbelow with reference to FIG. 10. Alternatively, space for digital signage 540a placement may be manually determined, e.g., by crowd-sourcing, or based on input from advertisers, vendors, image generation system designers, etc.

Note while blocks 540 and 550 are separately shown in FIG. 5 for illustrative purposes, it will be appreciated that blocks 540 and 550 may generally be integrated into one functional block in alternative exemplary embodiments. For example, digital signage 540*a* may include directions to preferred entity 520*a* that depend on where digital signage 540*a* is ultimately placed in immersive view 550*a*, and this functional inter-relation may thus be accounted for in computations performed by the image generation system jointly for blocks 540 and 550. Such alternative exemplary embodiments are contemplated to be within the scope of the present disclosure.

Figure 6:
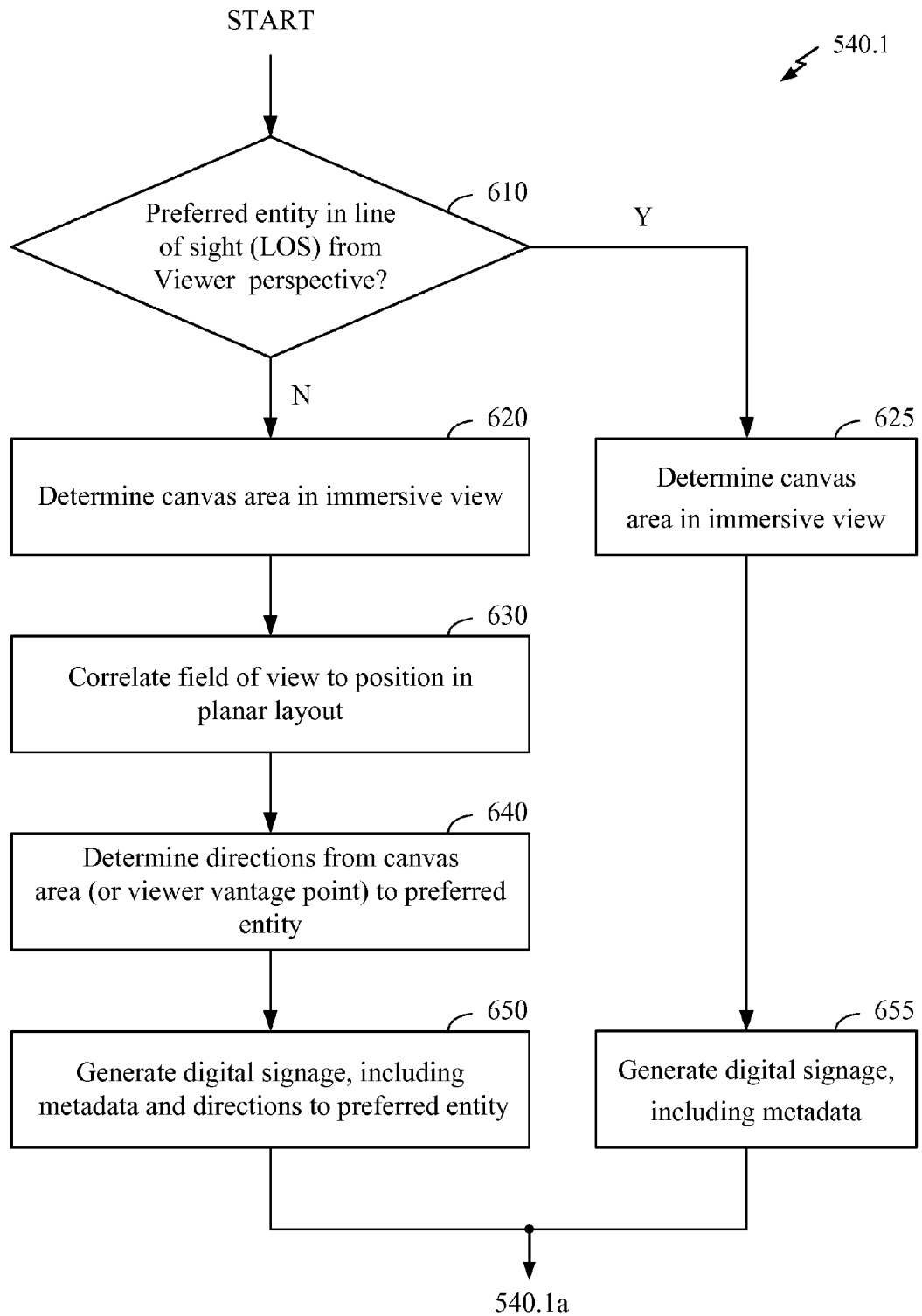
FIG. 6 illustrates an exemplary embodiment of block 540 in FIG. 5.

FIG. 6 illustrates an exemplary embodiment 540.1 of block 540 in FIG. 5. Note FIG. 6 is shown for illustrative purposes only, and is not meant to limit the scope of the present disclosure to any specific implementation of block 540 shown herein.

In FIG. 6, at block 610, it is determined whether the preferred entity is in the line of sight (LOS) from the viewer perspective, e.g., as specified by parameters 510*a*. In an exemplary embodiment, geometric data as obtained from planar layout 525*a* may be used to determine if preferred entity 520*a* is within the viewer's line of sight. Note an exemplary embodiment 610.1 of block 610 is further described hereinbelow with reference to FIG. 7 for illustrative purposes.

If the preferred entity is in the LOS, the system proceeds to block 625. If not, the system proceeds to block 620.

At block 625, if the preferred entity is within the LOS, then a "canvas area" is determined in the immersive view 530*a*. The canvas area may correspond to the position in immersive view 530*a* where digital signage 540*a* associated with preferred entity 520*a* will be superimposed. In an exemplary embodiment, when the preferred entity is in the LOS, the canvas area may be chosen to be, e.g., directly adjacent to the preferred entity in immersive view 525*a*.

Following block 625, at block 655, an exemplary embodiment 540.1*a* of digital signage 540*a*, is generated. Note digital signage 540*a* may include, e.g., metadata associated with preferred entity 520*a*.

At block 620, if preferred entity 520*a* is not within the LOS, then a "canvas area" is determined in immersive view 530*a*. Note when preferred entity 520*a* is not in the LOS, the canvas area may be chosen to be, e.g., in an "empty" area of immersive view 530*a* (e.g., any area non-overlapping with existing entities in view 530*a*), or any other blank or non-critical space as earlier described hereinabove with reference to FIG. 5.

In an exemplary embodiment, certain techniques may be utilized for determining an optimal canvas area in an immersive view for placement of digital signage, e.g., such as described with reference to blocks 620, 625. For example, immersive view 530*a* may be further associated with three-dimensional (3D) data describing properties of objects present in immersive view 530*a*, e.g., shapes, separation distances, etc. Such 3D data may be generated from a variety of sources, e.g., lidar, vision-based geometry, street footprints, etc. 3D information may thus be specified to identify the presence of "dynamic" occlusions in an immersive view, e.g., occlusions that appear in immersive view that are not expected to be present when a viewer is actually physically present at the viewer location and viewing the specified scene.

For example, referring to FIG. 3 hereinabove, block 625 may identify the area shown for placement of digital signage 310, in the absence of any static occlusions in the line of sight between the viewer position and building 120. However, referring to FIG. 10, a dynamic occlusion such as a large truck (illustratively represented in FIG. 10 as a blank rectangle 1010) making a left turn onto street 204 from street 202 may exist in immersive view 1000. Dynamic occlusion 1010 may not be present in planar layout 800 due to its dynamic nature, and occlusion 1010 may further happen to overlap with the area corresponding to building 120 in the immersive view, as well as the area where digital signage 310 is shown as being placed in FIG. 3.

In such an instance, block 625 may take any of several steps to address the situation. In a first scenario, if it is determined that a dynamic occlusion occludes a significant portion of an immersive view, then digital signage may simply not be displayed in the immersive view. The determination that the dynamic occlusion occludes a significant portion of an immersive view may be made, e.g., using data obtained during photography capture of the real-life scenes (such as data on separation distances from lidar, vision-based geometry, street footprints, etc., wherein a small separation distance between a camera and the occluding object would indicate that the occlusion may occupy a significant portion of the view), or from manual annotation by post-review of immersive views prior to upload to the system.

In a second scenario, if is determined that a dynamic occlusion (such as occlusion 1010 in FIG. 10) overlaps with an area that would be otherwise chosen for placement of digital signage, then the digital signage may be placed in an alternative canvas area. For example, digital signage for building 120 may be placed, e.g., slightly higher or more to the right than is currently shown for digital signage 310 in FIG. 3, to avoid overlap with the dynamic occlusion. It will be appreciated that techniques for determining such area overlap may account for, e.g., 3D information characterizing the spatial extent, position, and/or distance to camera of dynamic occlusion 1010 in immersive view 1000 (e.g., as obtained during photography capture of the immersive view). Such alternative exemplary embodiments are contemplated to be within the scope of the present disclosure.

In a third scenario, digital signage may still be placed adjacent to a corresponding entity even if a dynamic occlusion exists. In particular, digital signage may be placed directly on top of the dynamic occlusion.

In an exemplary embodiment, the presence of dynamic occlusions may be determined using 3D data (e.g., on separation distances, geometry, etc., generated from a variety of sources, e.g., lidar, vision-based geometry, street footprints, etc.) during photography capture of the immersive views, or determined during post-processing of the immersive views by manual or computer vision/pattern matching techniques. The identification of a dynamic occlusion may further be made by comparison and/or correlation with a planar layout 525*a*, e.g., to identify objects present in an immersive view but not present in a corresponding planar layout. Such alternative exemplary embodiments are contemplated to be within the scope of the present disclosure.

In an exemplary embodiment, the canvas area may alternatively or further be manually specified, e.g., by a sponsor of the preferred entity. For example, a representative of the proprietor of "First Bank," corresponding to building 220 in FIG. 2, or of "Bob's Dry Cleaner," corresponding to building 230 in FIG. 2, may directly specify to the image system that its associated digital signage should be placed in an immersive view at the positions shown in FIG. 3 or 4. In an exemplary embodiment, certain parameters of digital signage may thus be manually specified, e.g., the placement of digital signage within the immersive view, placement relative to other digital signage, size of the digital signage, etc. Such alternative exemplary embodiments are contemplated to be within the scope of the present disclosure.

At block 630, immersive view 530a is correlated to a corresponding field of view in planar layout 525a. This position may be determined by, e.g., accounting for viewing parameters 510a (e.g., specifying viewing location and viewing angle in planar layout 520a). For example, as illustrated in FIG. 8, field of view 808 may correspond to illustrative immersive view 100, as earlier described hereinabove with reference to FIG. 5.

At block 640, directions from the canvas area or viewing location in immersive view 530a to non-LOS preferred entity 520a are determined. In an exemplary embodiment, directions may include distance to be traveled, turns (e.g., right or left) to be taken, time required, etc., by a viewer initially starting from the specified viewing location.

At block 650, an exemplary embodiment 540.1a of digital signage 540a is generated for the non-LOS preferred entity. In an exemplary embodiment, the digital signage may include metadata associated with the preferred entity, and/or directions to preferred entity 520a, e.g., as determined at block 640.

Figure 7:
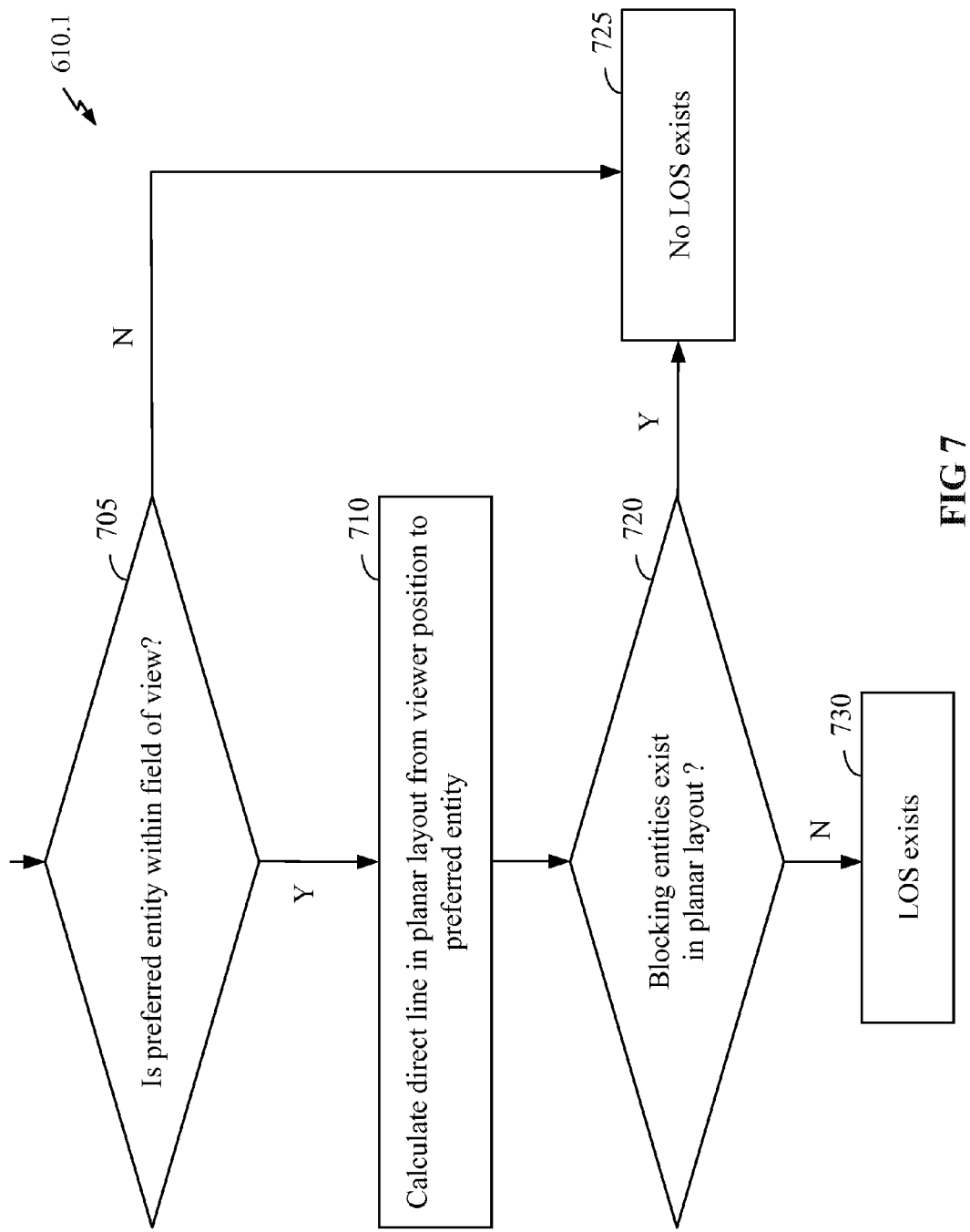
FIG. 7 illustrates an exemplary embodiment of block 610 in FIG. 6.

FIG. 7 illustrates an exemplary embodiment 610.1 of block 610 in FIG. 6. Note FIG. 7 is shown for illustrative purposes only, and is not meant to limit the scope of the present disclosure to any particular techniques for detecting whether an entity is within LOS of a viewer.

In FIG. 7, at block 705, it is determined whether preferred entity 520a is within a field of view of immersive view 530a. In an exemplary embodiment, this determination may be performed by comparing, in the planar layout 525a, the field of view defined by immersive view 530a with the location of preferred entity 520a. If preferred entity 520a is within the field of view, then the system may proceed to block 710. Otherwise, preferred entity 520a may be determined to be not within LOS at block 715.

For example, referring to FIG. 9, an indoor immersive view (not shown) of the second floor of a shopping mall having planar layout 900 may correspond to a field of view 908. Note in FIG. 9, field of view 908 may correspond to an area of the second floor 902 bordered by the dark bold line, wherein dotted segments 908a, 908b indicate that field of view 908 lies entirely on the second floor, and are effectively seen through a "transparent" layout of third floor 904. In this case if preferred entity 520a corresponds to, e.g., stall 950 on third floor 904, then it may be determined that entity 950 lies on the third floor, while field of view 908 is restricted to the second floor. Accordingly, preferred entity 520a is determined to lie outside field of view 908 on the second floor planar layout 902 defined by the immersive view.

In an exemplary embodiment, for a multi-level structure such as described with reference to FIG. 9, fields of view may be automatically defined to include no more than the area associated with a single floor, e.g., assuming that the floor/ceiling separating two stories in a multi-level building is opaque. In an alternative exemplary embodiment, the determination of LOS status in a multi-level structure may alternatively or in conjunction utilize "direct line calculation" techniques, e.g., as described hereinbelow with reference to blocks 720-725. Such alternative exemplary embodiments are contemplated to be within the scope of the present disclosure.

Returning to FIG. 7, at block 710, a direct line from the viewing location (e.g., as specified in parameters 510a) to the preferred entity 530a is calculated in planar layout 520a.

For example, for the illustrative planar layout 800 shown in FIG. 8 described hereinabove, direct line 801 may be drawn between viewing location 290 and illustrative preferred entity 830. Alternatively, for the illustrative planar layout 900 shown in FIG. 9 described hereinabove, direct line 901 may be drawn between viewing location 990 and illustrative preferred entity 950.

At block 720, it is determined whether the direct line intersects with any blocking entities, based on planar layout 520a. In an exemplary embodiment, geometric data, e.g., vertical height data, associated with entities intersecting direct line 710a may be utilized to determine whether such entities would constitute a "blocking entity."

For example, for the illustrative planar layout 800 shown in FIG. 8, direct line 801 intersects both entity 810 and entity 860. The fact that the vertical height of entity 810 is 150 meters, and the vertical height of entity 860 is 10 meters, may be used to establish the presence of two blocking entities.

Alternatively, for the illustrative planar layout 900 shown in FIG. 9, direct line 901 between the second floor 902 and third floor 904 intersects a "third level floor" entity 906 at point 905. Accordingly, the presence of the blocking entity is established.

If, at block 720, it is determined that there exist one or more blocking entities, then the system proceeds to block 725, where it is determined that no LOS exists. Alternatively, if it is determined that there exists no blocking entities, then the system proceeds to block 730, where it is determined that an LOS exists.

It will be appreciated that techniques of the present disclosure may be implemented on any hardware or software platforms suitable for an image generation system. In an exemplary embodiment, the image generation system may be implemented on one or more integrated circuits that constitute a mobile device, e.g., a smartphone, GPS navigation unit, or other type personal digital assistant. In alternative exemplary embodiments, the image generation system may be implemented on a desktop computer, or on one or more server computers accessible by computing devices over a wired or wireless network. For example, the generation and storage of immersive views, and generation and superimposition of digital signage may all be performed by a server computer, based on input provided by a user over an Internet connection. Such alternative exemplary embodiments are contemplated to be within the scope of the present disclosure.

Note digital signage as denoted herein may generally display any type of information associated with an entity in an immersive view, e.g., metadata and/or other features. In certain exemplary embodiments, digital signage may include, e.g., a link to more detailed or specific directions to an entity than is currently shown (or a link to simple directions if in a certain instance the digital signage is configured not to display directions), website, one or more links to an additional or alternative immersive view associated with an entity, etc. For example, digital signage 310 in FIG. 3 or 410 in FIG. 4 may include a link (e.g., a hyperlink associated with the name "First Bank") whereby a user can, if the link is selected, retrieve onto a display an immersive view corresponding to an interior view or other view of the building or business. It will be appreciated that one or more retrieved immersive views may also incorporate the techniques of the present disclosure, e.g., in generating digital signage in the presence of static or dynamic occlusions. Such alternative exemplary embodiments are contemplated to be within the scope of the present disclosure.

Figure 11:
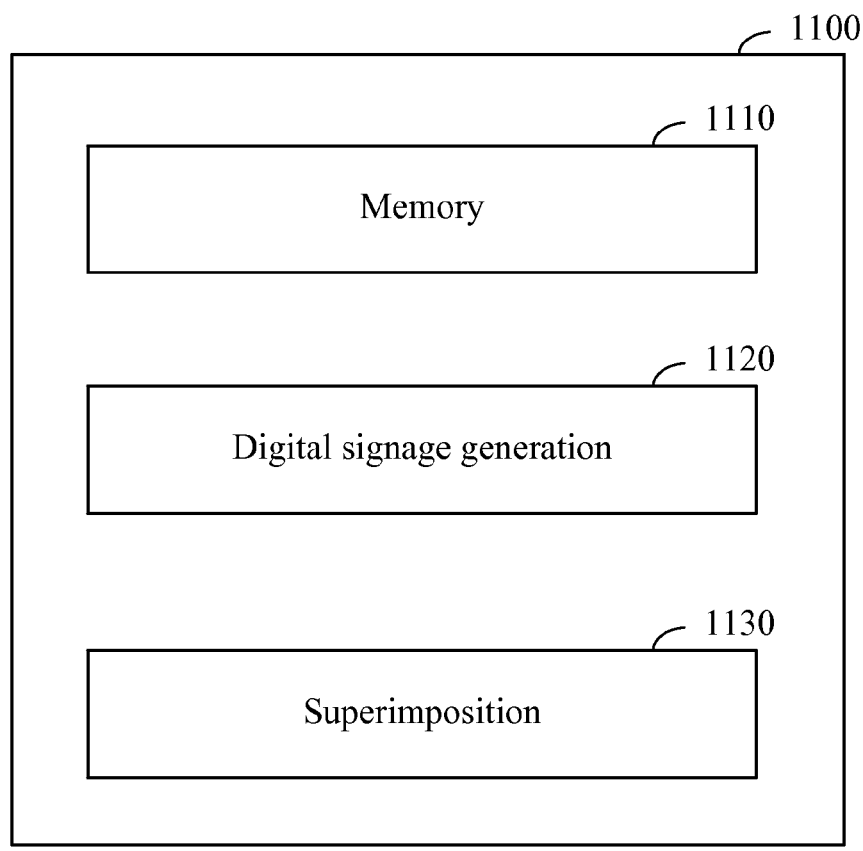
FIG. 11 illustrates an exemplary embodiment of an apparatus according to the present disclosure.

FIG. 11 illustrates an exemplary embodiment of an apparatus 1100 according to the present disclosure. Note FIG. 11 is shown for illustrative purposes only, and is not meant to limit the scope of the present disclosure.

In FIG. 11, apparatus 1100 comprises a memory 1110 storing an immersive view corresponding to viewing parameters comprising a viewing location, and data associated with a preferred entity not displayed in the immersive view. Memory 1110 further stores a planar layout corresponding to the viewing location. Apparatus 1100 further comprises a digital signage generation block 1120 configured to: based on the planar layout, determine a presence of a blocking entity between the viewing location and the preferred entity; and generate digital signage comprising the data associated with the preferred entity, the digital signage further comprising an indication that the preferred entity is not displayed in the immersive view if the presence of a blocking entity is determined. Apparatus 1100 further comprises a superimposition block 1130 configured to superimpose the digital signage onto the immersive view to generate an annotated immersive view.

Figure 12:
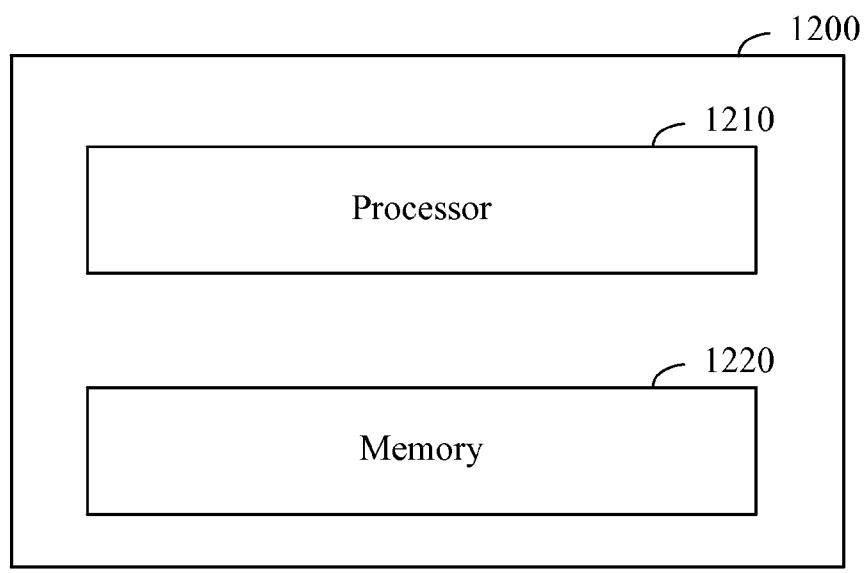
FIG. 12 illustrates an exemplary embodiment of a computing device according to the present disclosure.

FIG. 12 illustrates an exemplary embodiment of a computing device 1200 according to the present disclosure. Note FIG. 12 is shown for illustrative purposes only, and is not meant to limit the scope of the present disclosure.

In FIG. 12, computing device 1200 includes a processor 1210 and a memory 1220 holding instructions executable by the processor to: retrieve from the memory an immersive view corresponding to viewing parameters comprising a viewing location, and data associated with a preferred entity not displayed in the immersive view; retrieve from the memory a planar layout corresponding to the viewing location; based on the planar layout, determine a presence of a blocking entity between the viewing location and the preferred entity; and generate digital signage comprising the data associated with the preferred entity, the digital signage further comprising an indication that the preferred entity is not displayed in the immersive view if the presence of a blocking entity is determined; and superimpose the digital signage onto the immersive view to generate an annotated immersive view.

Figure 13:
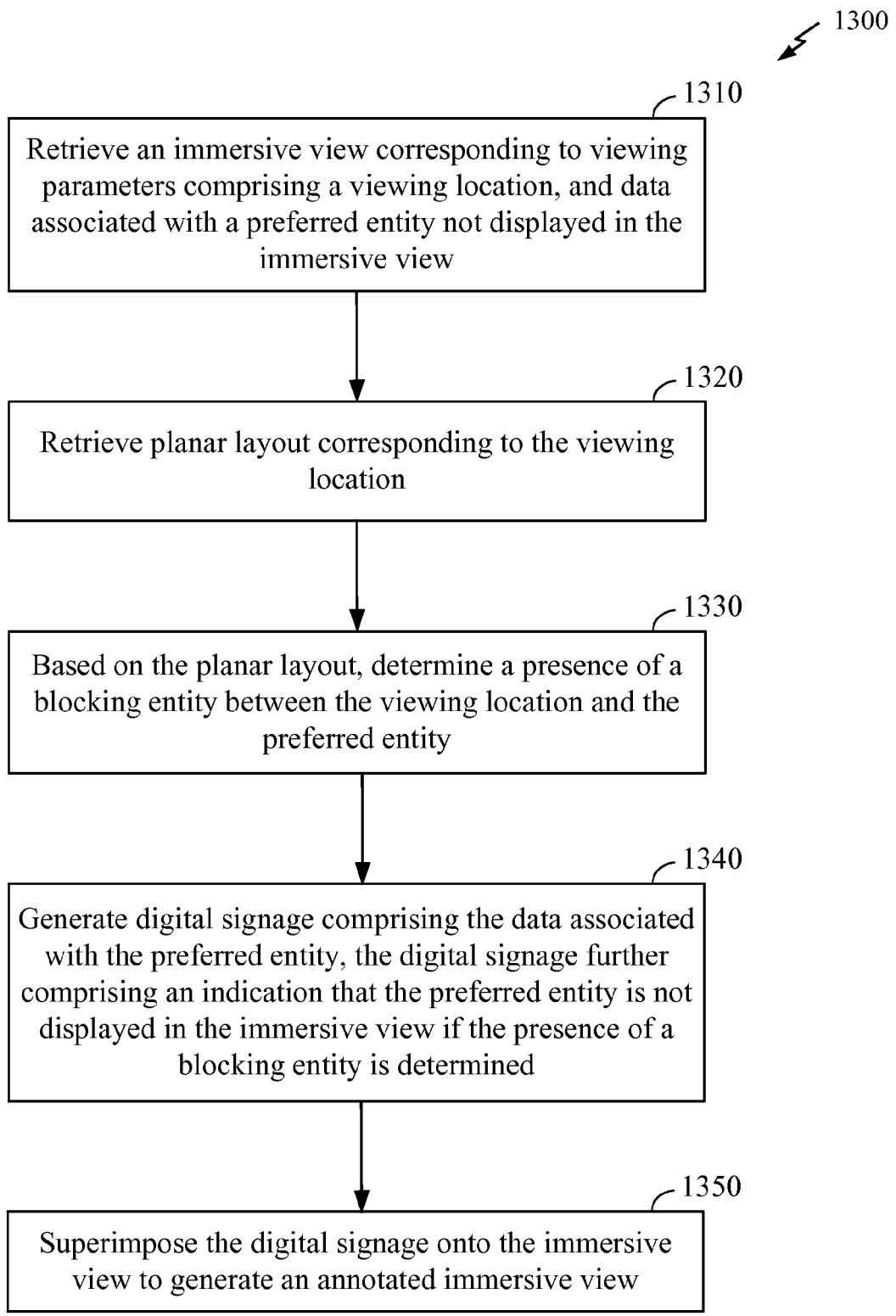
FIG. 13 illustrates an exemplary embodiment of a method according to the present disclosure.

FIG. 13 illustrates an exemplary embodiment 1300 of a method according to the present disclosure. Note FIG. 13 is shown for illustrative purposes only, and is not meant to limit the scope of the present disclosure.

In FIG. 13, at block 1310, an immersive view is retrieved corresponding to viewing parameters comprising a viewing location, and data associated with a preferred entity not displayed in the immersive view.

At block 1320, a planar layout is retrieved corresponding to the viewing location.

At block 1330, based on the planar layout, a presence of a blocking entity between the viewing location and the preferred entity is determined.

At block 1340, digital signage is generated, the digital signage comprising the data associated with the preferred entity, the digital signage further comprising an indication that the preferred entity is not displayed in the immersive view if the presence of a blocking entity is determined.

At block 1350, the digital signage is superimposed onto the immersive view to generate an annotated immersive view.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. An apparatus comprising:
a memory storing an immersive view corresponding to viewing parameters comprising a viewing location, and data associated with a preferred entity not displayed in the immersive view, the memory further storing a planar layout corresponding to the viewing location;
a digital signage generation block configured to:
based on the planar layout, determine a presence of a blocking entity between the viewing location and the preferred entity; and
generate digital signage comprising the data associated with the preferred entity, the digital signage further comprising an indication that the preferred entity is not displayed in the immersive view if the presence of a blocking entity is determined;
the apparatus further comprising a superimposition block configured to superimpose the digital signage onto the immersive view to generate an annotated immersive view.

2. The apparatus of claim 1, said viewing parameters comprising a field of view, the preferred entity lying outside the field of view.

3. The apparatus of claim 2, the planar layout comprising area and vertical height occupied by each of a plurality of entities, the plurality of entities comprising the preferred entity.

4. The apparatus of claim 3, the digital signage generation block further configured to determine the presence of the blocking entity by determining whether a direct line between the viewing location and the preferred entity intersects at least one of the plurality of entities.

5. The apparatus of claim 3, the plurality of entities comprising buildings on a street and sections of a building interior.

6. The apparatus of claim 2, the indication that the preferred entity is not displayed in the immersive view comprising directions from the viewing location to the preferred entity.

7. The apparatus of claim 1, the superimposition block configured to superimpose the digital signage onto the immersive view at a portion of the immersive view designated as blank space.

8. The apparatus of claim 3, the planar layout further comprising a vertical position occupied by each of the plurality of entities, the viewing parameters comprising a vertical viewing position.

9. The apparatus of claim 1, the superimposition block further configured to superimpose the digital signage onto a canvas area of the immersive view, the canvas area calculated to be non-overlapping with at least one dynamic occlusion present in the immersive view.

10. The apparatus of claim 1, the digital signage further comprising a link to a second immersive view, the digital signage generation block further configured to receive user selection of the link, the apparatus further comprising a display for displaying the second immersive view responsive to user selection of the link.

11. A method comprising:
retrieving an immersive view corresponding to viewing parameters comprising a viewing location, and data associated with a preferred entity not displayed in the immersive view;
retrieving a planar layout corresponding to the viewing location;
based on the planar layout, determining a presence of a blocking entity between the viewing location and the preferred entity;
generating digital signage comprising the data associated with the preferred entity, the digital signage further comprising an indication that the preferred entity is not displayed in the immersive view if the presence of a blocking entity is determined; and
superimposing the digital signage onto the immersive view to generate an annotated immersive view.

12. The method of claim 11, further comprising displaying the annotated immersive view on a digital display.

13. The method of claim 12, the planar layout comprising area and vertical height occupied by each of a plurality of entities, the plurality of entities comprising the preferred entity.

14. The method of claim 13, the determining the presence of the blocking entity comprising determining whether a direct line between the viewing location and the preferred entity intersects at least one of the plurality of entities.

15. The method of claim 13, the plurality of entities comprising buildings on a street and sections of a building interior.

16. The method of claim 12, the indication that the preferred entity is not displayed in the immersive view comprising directions from the viewing location to the preferred entity.

17. The method of claim 11, the superimposing comprising superimposing the digital signage onto the immersive view at a portion of the immersive view designated as blank space.

18. The method of claim 13, the planar layout further comprising a vertical position occupied by each of the plurality of entities, the viewing parameters comprising a vertical viewing position.

19. The method of claim 11, the superimposition block further configured to superimpose onto the immersive view digital signage comprising data associated with an entity displayed in the immersive view.

20. A computing device including a processor and a memory holding instructions executable by the processor to:
retrieve from the memory an immersive view corresponding to viewing parameters comprising a viewing location, and data associated with a preferred entity not displayed in the immersive view;
retrieve from the memory a planar layout corresponding to the viewing location;
based on the planar layout, determine a presence of a blocking entity between the viewing location and the preferred entity; and
generate digital signage comprising the data associated with the preferred entity, the digital signage further comprising an indication that the preferred entity is not displayed in the immersive view if the presence of a blocking entity is determined; and
superimpose the digital signage onto the immersive view to generate an annotated immersive view.

* * * * *